(12) United States Patent
Griffith et al.

(10) Patent No.: US 12,173,527 B2
(45) Date of Patent: Dec. 24, 2024

(54) GRAIN BIN DUCTING SYSTEMS

(71) Applicant: WPS Investments Limited, Saskatoon (CA)

(72) Inventors: Jason Griffith, Saskatoon (CA); William Strelioff, Saskatoon (CA); Sean Strelioff, Warman (CA)

(73) Assignee: WPS Investments Limited (CA)

( * ) Notice: Subject to any disclaimer, the term of this patent is extended or adjusted under 35 U.S.C. 154(b) by 546 days.

(21) Appl. No.: 17/468,787

(22) Filed: Sep. 8, 2021

(65) Prior Publication Data

US 2023/0074072 A1    Mar. 9, 2023

(51) Int. Cl.
*E04H 7/22* (2006.01)
*A01F 25/00* (2006.01)
*A01F 25/22* (2006.01)
*B65D 88/74* (2006.01)

(52) U.S. Cl.
CPC ............ *E04H 7/22* (2013.01); *A01F 25/00* (2013.01); *A01F 25/22* (2013.01); *B65D 88/745* (2013.01); *Y02A 40/51* (2018.01)

(58) Field of Classification Search
CPC .......... E04H 7/22; A01F 25/00; A01F 25/22; B65D 88/745; Y02A 40/51
USPC ...................................................... 52/302.2
See application file for complete search history.

(56) References Cited

U.S. PATENT DOCUMENTS

| | | | | |
|---|---|---|---|---|
| 3,555,997 A | * | 1/1971 | Van der Lely | A01F 15/04 100/189 |
| 3,591,994 A | * | 7/1971 | Steffen | B65D 88/742 52/302.2 |
| 3,608,204 A | * | 9/1971 | Ashby | B65D 90/06 220/565 |
| 4,009,520 A | * | 3/1977 | Sukup | F26B 9/103 34/233 |
| 4,057,295 A | * | 11/1977 | Liet | B65D 90/024 52/192 |

(Continued)

FOREIGN PATENT DOCUMENTS

| | | | | |
|---|---|---|---|---|
| AU | 2011200534 B2 | | 9/2015 | |
| CA | 2729411 A1 | * | 9/2011 | ........... B65D 88/742 |

(Continued)

OTHER PUBLICATIONS

AGI Grain Guard Aeration Brochure available at https://www.aggrowth.com/contentassets/00d4b0b4edfa4d58b9adeedee20cfaca/agi-grain-guard-aeration-brochure.pdf (last accessed Aug. 11, 2021).

(Continued)

*Primary Examiner* — Brent W Herring
(74) *Attorney, Agent, or Firm* — LeonardPatel PC; Michael A. Leonard, II; Sheetal S. Patel

(57) ABSTRACT

Grain bin ducting systems are disclosed that more evenly disperse air through a grain bin while also preventing moisture from building up on the top and sides of a grain bin, which can lead to undesirable moisture levels for parts of the grain bin or even ruin grain. Airflow resistance may be reduced in a grain bin by having the air travel in a horizontal direction through the grain bin instead of a vertical direction. Normally, the radius of the grain bin is substantially less than the height of the grain bin, so the resistance to airflow is substantially lower than in typical grain bin ducting systems.

18 Claims, 13 Drawing Sheets

(56) References Cited

U.S. PATENT DOCUMENTS

| | | | | |
|---|---|---|---|---|
| 4,662,137 | A | * | 5/1987 | Edgar .................. F25D 23/064 |
| | | | | 52/245 |
| 5,960,558 | A | * | 10/1999 | Bourgault ............... F26B 23/10 |
| | | | | 34/493 |
| 7,818,894 | B2 | | 10/2010 | Noyes et al. |
| 8,677,648 | B2 | | 3/2014 | Schreiner |
| 9,832,933 | B2 | | 12/2017 | Thiessen |
| 11,874,059 | B2 | * | 1/2024 | Pincemin ................ F26B 9/063 |
| 2007/0234587 | A1 | | 10/2007 | Pierson et al. |
| 2009/0094853 | A1 | * | 4/2009 | Noyes .................... F26B 9/103 |
| | | | | 34/232 |
| 2009/0223078 | A1 | | 9/2009 | Penner |
| 2011/0219638 | A1 | | 9/2011 | Schreiner |
| 2012/0047762 | A1 | | 3/2012 | Neufeld et al. |
| 2014/0026436 | A1 | * | 1/2014 | Schreiner ............... A01F 25/00 |
| | | | | 34/443 |
| 2014/0378044 | A1 | * | 12/2014 | Thiessen ............. B65D 88/742 |
| | | | | 454/181 |
| 2017/0020078 | A1 | | 1/2017 | Schreiner |
| 2021/0325111 | A1 | * | 10/2021 | O'Hare .................. F26B 9/103 |

FOREIGN PATENT DOCUMENTS

| | | | | | |
|---|---|---|---|---|---|
| CN | 205713377 | U | * | 11/2016 | |
| CN | 206686656 | U | | 12/2017 | |
| CN | 109832018 | A | | 6/2019 | |
| CN | 209672753 | U | | 11/2019 | |
| KR | 100483167 | B1 | * | 4/2005 | ............. A01F 25/00 |

OTHER PUBLICATIONS

Gatco CrossFlow Aeration Page available at http://gatcomfg.com/product/crossflow-aeration/ (last accessed Aug. 11, 2021).

Hopper Bin Air Comparisons available at https://grainbinstorage.ca/wp-content/uploads/2016/03/2016-Competitor-Comparison-Hopper-Technical-Aeration.pdf (last accessed Aug. 11, 2021).

Hopper Bin Natural Air Drying Systems Article 1 (588) available at http://pami.ca/pdfs/reports_research_updates/(1b)%20Grain%20and%20Forage%20Dryers/588.PDF (Mar. 1989).

Hopper Bin Natural Air Drying Systems Article 2 (578) available at https://open.alberta.ca/dataset/d1cd22dd-a653-4e63-b9bd-837898af8c21/resource/3c78145b-2cab-4233-9a90-68f734637112/download/578-afmrc.pdf (Aug. 1989).

Hopper Bottom Bin Natural Air Drying Systems Article available at http://pami.ca/pdfs/reports_research_updates(1b)%20Grain%20and%20Forage%20Dryers/500.PDF (May 1986).

Safe-Grain Hopper Aeration Page available at https://safegrain.com/?page_id=1443 (last accessed Aug. 11, 2021).

Office Action, issued Mar. 6, 2024, CA Patent Application No. 3,171,870.

* cited by examiner

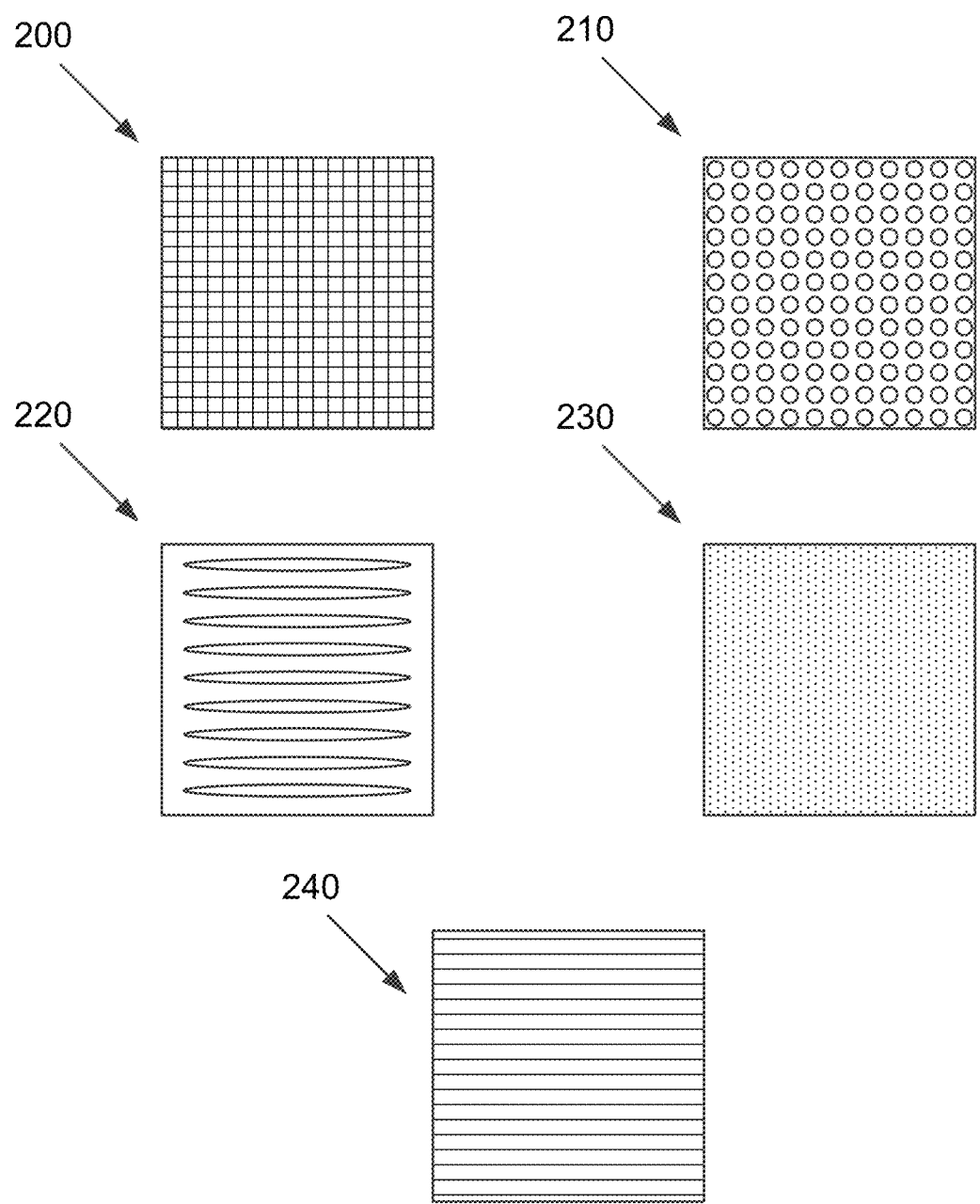

350

FIG. 3D
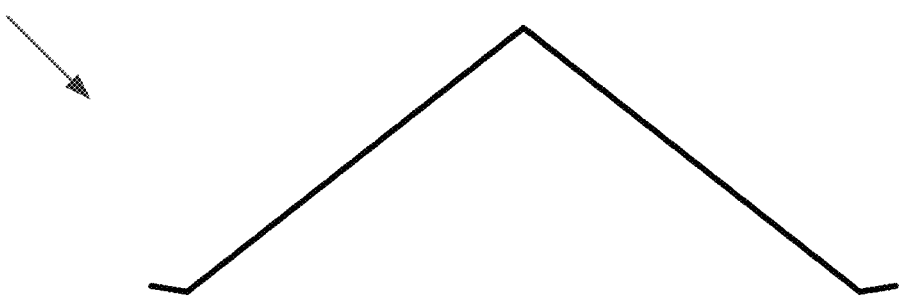
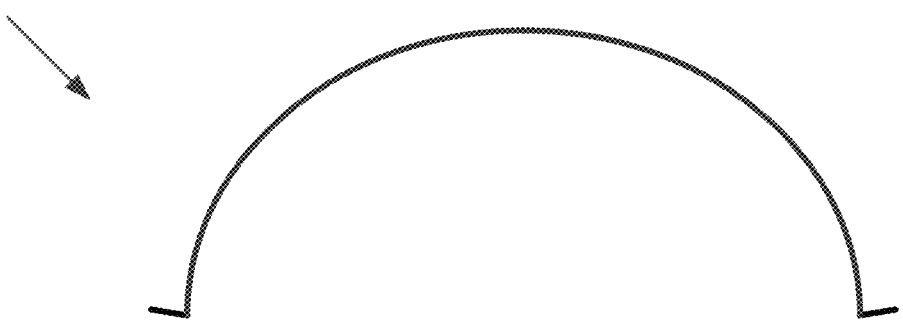

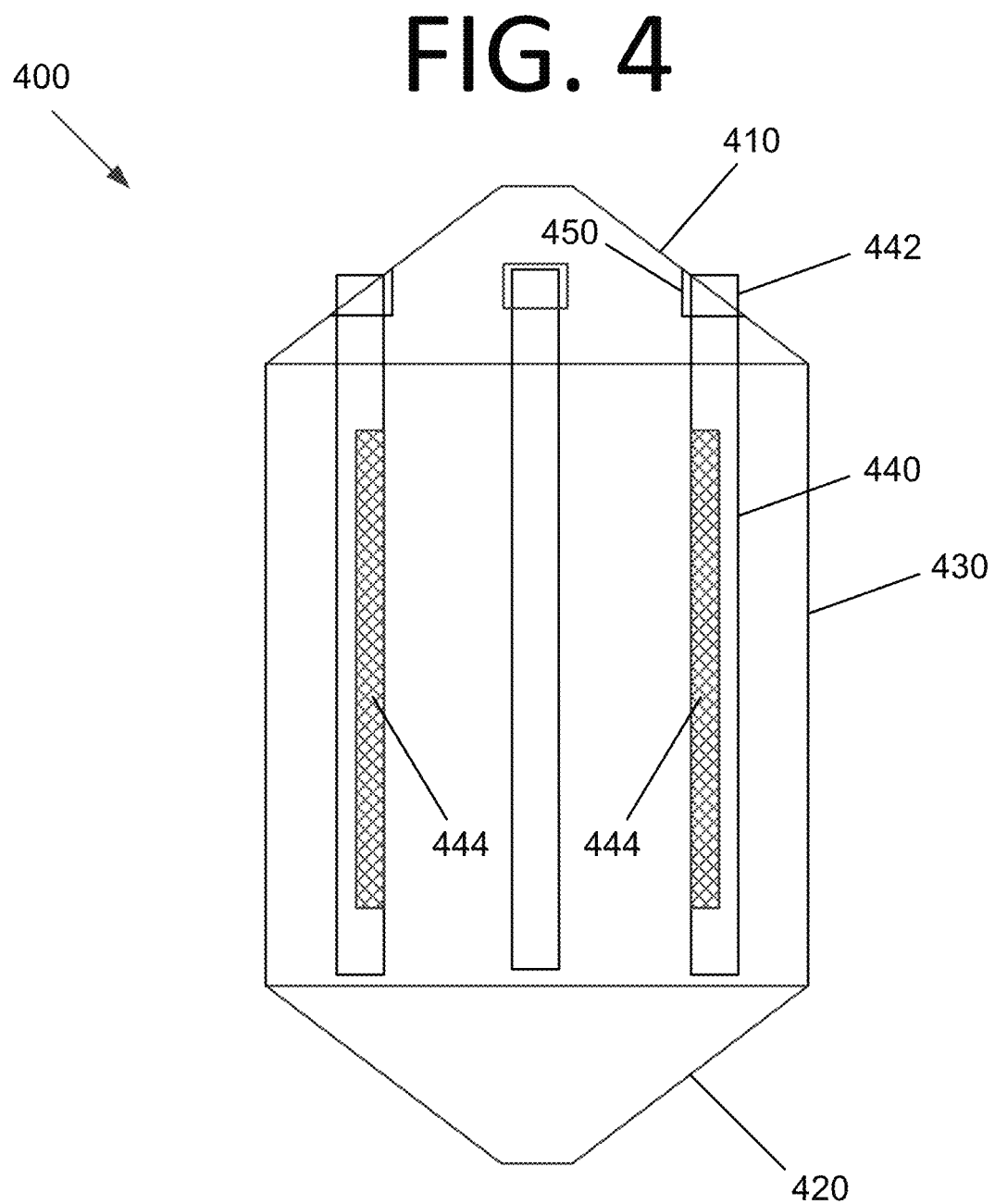

GRAIN BIN DUCTING SYSTEMS

FIELD

The present invention generally relates to grain aeration, and more specifically, to ducting systems that promote airflow through grain and/or prevent moisture from collecting on a roof or wall of a grain bin to reduce moisture content in the grain.

BACKGROUND

To be able to store grain for an extended period, the grain should be at a safe moisture and temperature. Often, grain is not harvested at the optimum storage conditions due to constraints such as time and weather. For this reason, it is a common practice to condition the grain to bring it within the safe storage parameters once it is in the grain bin or by using a high-capacity grain dryer. Grain dryers require a high capital cost and are expensive to operate. They also require manpower to properly manage because grain must be moved from grain bins to the dryer and then back to a grain bin.

Another common method of getting grain to the safe storage parameters is by using aeration and natural air drying (NAD), both of which involve utilizing a fan to blow air through grain that is stored inside a grain bin. The purpose of aeration is to get the grain to a uniform temperature or to cool the grain and make it safer for storage. The purpose of NAD is to remove moisture from the grain to lower the moisture content. NAD is suitable for removing a small amount of moisture, such as one or two percentage points. If larger amounts of moisture need to be removed, then high-capacity dryers are typically used. The primary difference between aeration and NAD is that aeration typically requires a minimum airflow of 0.1 to 0.2 cubic feet per minute (cfm) per bushel of grain in the storage bin (e.g., a 5,000 bushel bin requires 500 to 1,000 cfm of aeration airflow), whereas NAD typically requires a minimum of 1 to 2 cfm per bushel in the storage bin (e.g., a 5,000 bushel bin requires 5,000 to 10,000 cfm of NAD airflow). For drying to occur, the more airflow that is provided, the better. Another difference is that NAD will sometimes be paired with a heater to warm the air prior to air entering the grain bin to speed the drying rate. Typically, the fan is located near the bottom of the grain bin and blows the air from the bottom to the top of the grain and the air exits the grain bin through vents in the roof or through a man hole and the filling hole, which are also both in the roof.

Grain bins are large cylindrical structures, typically manufactured from metal. Bins vary in size, but are typically over 20 feet tall and more than 15 feet in diameter. If the air is entering the bin at the bottom, the air must travel vertically through all the grain to exit through the roof vents. This means the air must travel through a column of grain that is 20 feet high or more. Forcing the air through such a long column of grain creates a large amount of resistance to the airflow, limiting the amount of air that can be forced through the grain, and therefore reducing the drying capabilities.

Graph 100 of FIG. 1 shows the resistance of airflow through wheat as a function of grain depth. As can be seen, the airflow resistance increases exponentially as grain depth increases. Thus, the taller the bin, the more grain there is (assuming the same diameter), which means more airflow is required. However, the taller the bin, the higher the resistance to airflow, which results in lower airflow rates and reduced rates of drying and aeration. For example, when drying wheat at 2 cfm per bushel, if the height of the grain is increased from 15 feet to 30 feet, the resistance to airflow within the grain increases from 15 inches of water to 77 inches of water, which is impractical. Reducing the distance that the air needs to travel through the grain is critical to improving the drying capability.

Another challenge to conditioning grain inside grain bins is that the air entering the grain absorbs moisture from the grain kernels. As the air travels through the grain, the air becomes saturated with moisture from the grain. As the air travels upwards, the air comes in contact with cooler grain, which cools the air and reduces the amount of moisture that the air can hold. The result is that the air sheds some moisture and the grain absorbs the shed moisture. This causes the grain in the lower area of the grain bin to become too dry and the grain in the higher areas to increase in moisture content. Over time, a drying front of moist grain and air slowly moves upwards through the grain. The end result is typically the grain at the bottom being too dry and the grain higher up being too moist. In general, there is an accepted standard moisture level within the grain industry that is considered "dry" for each grain type. It is to the producer's advantage to sell their grain in the target moisture range of "dry" to 0.5% less than dry. Any moisture level above "dry" will result in additional costs to the producer.

Another consideration is that grain bins are typically constructed from metal, and the surface of the grain bin is typically exposed to the ambient air, which can be colder than the temperature of the grain depending on the weather conditions. Thus, when the warm moist air inside the grain bin contacts the cool metal surface, moisture begins to condense on the metal. Condensation can occur on the walls and roof, with the roof typically having the most condensation. Even if many roof vents are installed, condensation can still occur. As ambient temperatures decrease, the risk of condensation increases. In western Canada, for example, grain is harvested and conditioned in the fall when the ambient temperature is decreasing, often to freezing temperatures (i.e., below 32° F. or 0° C.°). When the moisture condenses on the roof, it can drip off the roof and back into the grain, rewetting the grain. The moisture can also run down the roof and walls, causing the outside grain to become damp. In extreme situations, the water can cause the grain along the walls and at the bottom of the bin to become saturated. This often results in grain spoilage in these areas.

Air ducting systems have been employed inside grain bins to attempt to address these issues. One of the most common is for a flat bottom bin to have a perforated floor with an air gap below the floor. The air from the fan is blown into the air void and then distributed evenly throughout the bottom of the bin through the perforated flooring. This still requires the air to travel through the full depth of the grain. Also, such systems do not address the over-drying of the grain at the bottom or the condensation.

Grain bins often have a cone-shaped bottom called a hopper bottom to facilitate emptying of the grain bin. In these configurations, a perforated floor such as that discussed above is not possible. Ducting systems have been developed that attempt to more evenly distribute the air inside hopper bottom grain bins. The most well-known ducting system for hopper bottom bins is the Grain Guard Rocket™. The Rocket™ is a double walled, louvered slotted vertical cylinder that is installed inside a hopper bottom grain bin. An air duct connects the Rocket™ to an external fan. Air from the fan enters the Rocket™, flows outwards into the grain, and generally travels in an upwards direction through the grain. Because the airflow tends to travel upwards, the majority of the drying occurs in the center portion of the bin.

Another, simpler air ducting system is an inverted "V" that is installed near the top of the hopper. Under the "V," a void is created in the grain. A fan is connected to an air duct that is attached to the underside of the "V." This allows the air to flow into the air void and then be forced into the grain.

Another approach at reducing airflow resistance is the GATCO Manufacturing CrossFlow™ aeration system. See, for example, U.S. Patent Application Publication Nos. 2011/0219638 and 2017/0020078. This design ducts air from the fan to vertical channels installed on the bin wall. The channels on the bin wall are perforated to create an air void between the bin wall and the grain that allows a column for air to flow. Air flows from the channels, into the bin and then to a cylindrical, perforated exhaust tube at the center of the bin. This system requires ducting on the outside of the grain bin, which can be expensive and more complicated to install. Having the ducting on the outside of the bin also means that if using heat for NAD, some of the heat will be lost to the atmosphere before entering the grain. This results in lower air temperatures and less drying capacity. Accordingly, improved grain bin ducting systems addressing issues with condensation may be beneficial.

SUMMARY

Certain embodiments of the present invention may provide solutions to the problems and needs in the art that have not yet been fully identified, appreciated, or solved by current grain aeration and drying technologies. For example, some embodiments of the present invention pertain to ducting systems that promote airflow through grain and/or prevent moisture from collecting on a roof or wall of a grain bin to reduce moisture content in the grain.

In an embodiment, a grain bin includes a central air distribution tube configured to disperse air outward from a center of the grain bin. The grain bin also includes a wall. The grain bin further includes one or more insulated channels located within a wall of the grain bin. The one or more insulated channels are configured to function as air ducts such that, in operation, at least some of the dispersed air from the central air distribution tube flows through grain in the grain bin towards the one or more insulated channels and out of the grain bin via the one or more insulated channels. At least part of portions of the one or more insulated channels facing towards the central air distribution tube are perforated.

In another embodiment, a grain bin includes a central air distribution tube configured to disperse air outward from a center of the grain bin. The grain bin also includes a wall. The grain bin further includes one or more channels located within the wall of the grain bin. The one or more channels are configured to function as air ducts such that, in operation, at least some of the dispersed air from the central air distribution tube flows through grain in the grain bin towards the one or more insulated channels and out of the grain bin via the one or more channels. Additionally, the grain bin includes insulation located between the one or more channels and the wall. At least part of portions of the one or more channels facing towards the central air distribution tube are perforated.

In yet another embodiment, an apparatus includes a central air distribution tube configured to disperse air outward from a center of the apparatus. The apparatus also includes a wall. The apparatus further includes one or more channels located within the wall including respective top portions that extend outward through a roof of the apparatus. The one or more channels are configured to function as air ducts such that, in operation, at least some of the dispersed air from the central air distribution tube flows through grain in the grain bin towards the one or more insulated channels and out of the apparatus via the one or more channels. The apparatus further includes channel air vents covering the top portions of the one or more channels. The channel air vents are configured to allow the dispersed air to travel upwards through the one or more channels and be exhausted outside the roof of the apparatus.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 illustrates example perforation types, according to an embodiment of the present invention.

FIG. 3D is a top or bottom view illustrating some example channel shapes, according to an embodiment of the present invention.

FIG. 3I is a perspective view illustrating a channel air vent cover, according to an embodiment of the present invention.

FIG. 4 is a side view illustrating a grain bin with channels located inward from a wall of the grain bin, according to an embodiment of the present invention.

Unless otherwise indicated, similar reference characters denote corresponding features consistently throughout the attached drawings.

DETAILED DESCRIPTION OF THE EMBODIMENTS

Some embodiments pertain to grain bin ducting systems that more evenly disperse air through a grain bin while also preventing moisture from building up on the top and sides of a grain bin, which can lead to undesirable moisture levels for parts of the grain bin or even ruin grain. More specifically, some embodiments attempt to reduce airflow resistance in a grain bin by having the air travel in a horizontal direction through the grain bin instead of a vertical direction. Normally, the radius of the grain bin is substantially less than the height of the bin, so the resistance to airflow is substantially lower than that of bottom-up or top-down systems.

Figure 5:
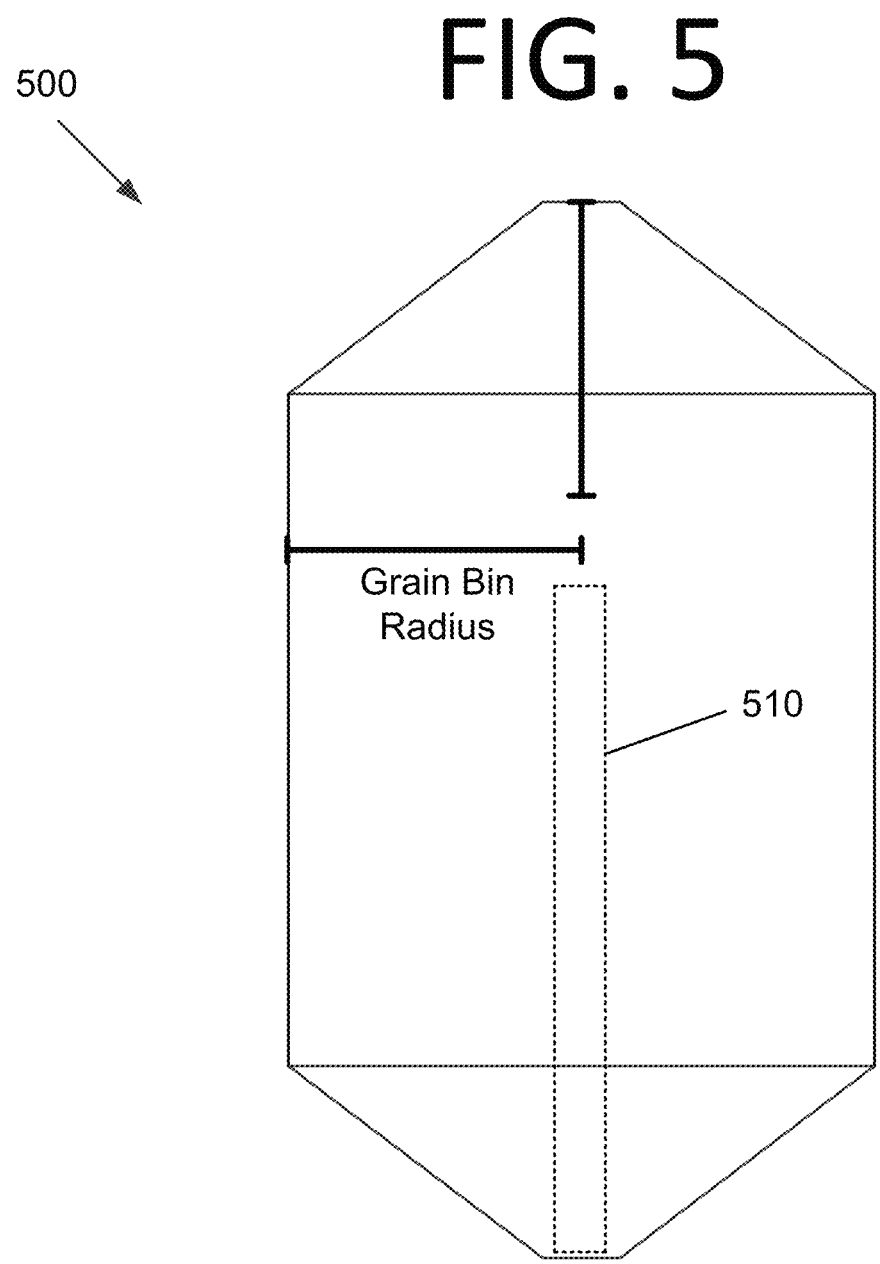
FIG. 5 is a side view illustrating a grain bin with a central air distribution tube with a height that is less than the height of the center of the grain bin by an amount approximately equal to the grain bin radius, according to an embodiment of the present invention.

In some embodiments, a central air distribution tube disperses air from the center of the grain bin horizontally outward, substantially horizontal with a variation within a few degrees, or at any other suitable angle without deviating from the scope of the invention. In certain embodiments the distance between the central air distribution tube and the grain bin hopper is large enough to allow grain to flow between the central air distribution tube and the hopper when emptying the grain bin. The bottom of the central air distribution tube is open in some embodiments to allow any debris that may accumulate in the central air distribution tube to flow out the bottom of the central air distribution tube when the grain bin is emptied. Also, the height of the central air distribution tube would be less than the height of the center of the grain bin by an amount approximately equal to the grain bin radius in some embodiments to ensure that the majority of the airflow is directed towards the wall channels. See grain bin 500 and central air distribution tube 510 of FIG. 5.

In some embodiments, multiple channels are installed onto the inside of the grain bin walls that create an air duct between the wall and the grain where air can flow freely upwards and out of the grain bin. In certain embodiments, the tops of the channels extend slightly beyond the roof of the grain bin through a channel air vent, which is covered by a channel air vent cover to allow the warm damp air to travel upwards and be exhausted outside the grain bin roof, preventing moisture from condensing on the inside of the grain bin roof. The top of the channel is not perforated in some embodiments to force the warm moist air to the roof vent and prevent the air from entering the air space between the grain and the grain bin roof. The channel air vents are designed to be larger than the area of the channel to allow any air between the grain and the grain bin roof to be vented to the atmosphere.

In some embodiments, insulation is included between the channels and the grain bin wall that prevents the warm, damp air that enters the air space in the channel from contacting the grain bin wall. The grain bin wall is typically cooler than the air and would cause moisture to condense on the wall and then run down the wall, potentially damaging the grain and reducing the amount of moisture that is exhausted from the grain bin. In certain embodiments, the wall channels are installed in from the wall (e.g., by six inches, by a foot, by several feet, etc.). The channels could be cylindrical and suspended from the grain bin roof, such that the grain between the channel and the wall would act as insulation, preventing condensation.

Some embodiments include one or more fans connected by respective ducts to a central air distribution tube. The central air distribution tube in some embodiments is a cylindrical tube with perforations covering at least a portion of its surface. As used herein, "perforations" include, but are not limited to, mesh, holes, slits, louvred material, vents, any combination thereof in any desired pattern and orientation, etc. For instance, FIG. 2 shows some example perforation types, including mesh 200, holes 210, slits 220, louvred material 230, and vents 240. It should be noted that the perforation examples in FIG. 2 are not necessarily drawn to scale. Perforations should be smaller than the kernels or other types of individual pieces of the grain stored in the grain bin to prevent the grain from entering the central air distribution tube when the fan(s) are not running.

The central air distribution tube may be mounted in the center of the grain bin near the bottom and may extend upwards towards the top of the grain bin. The central air distribution tube may be offset from the center of the grain bin in some embodiments, but this would tend to allow less airflow to reach channels more distant from the central air distribution tube, assuming even air distribution therefrom. There is an area left under the central air distribution tube in some embodiments to allow grain to flow out for emptying the grain bin. The distance between the top of the central air distribution tube and the top of the grain bin may be a height that is similar to or slightly more than the radius of the grain bin in some embodiments.

Some embodiments also have multiple channels installed onto the walls of the grain bin, although in certain embodiments one, some, or all of the channels may be installed inward from and spaced apart from the walls in some embodiments. These channels provide air ducts where air can flow more freely. Portions of the channels are perforated to allow air from the central air distribution tube to flow therein. These perforations should also be smaller than the grain kernels or other individual pieces.

The air from the central air distribution tube flows through the grain towards the channels, enters the channels via their perforations, and flows up to the top of the channels. The top of the channels extends slightly beyond the roof of the grain bin through a channel air vent in some embodiments and may be covered by a channel air vent cover. This allows the relatively warm and damp air to travel upwards and be exhausted outside the roof of the grain bin to prevent moisture from condensing on the inside of the roof. Top portions of the channels proximate to the roof of the grain bin are not perforated in some embodiments so moist air from the channels does not enter the space between the top of the grain and the roof of the grain bin.

Figure 1:
FIG. 1 is a graph illustrating airflow resistance in wheat.
Figure 3A:
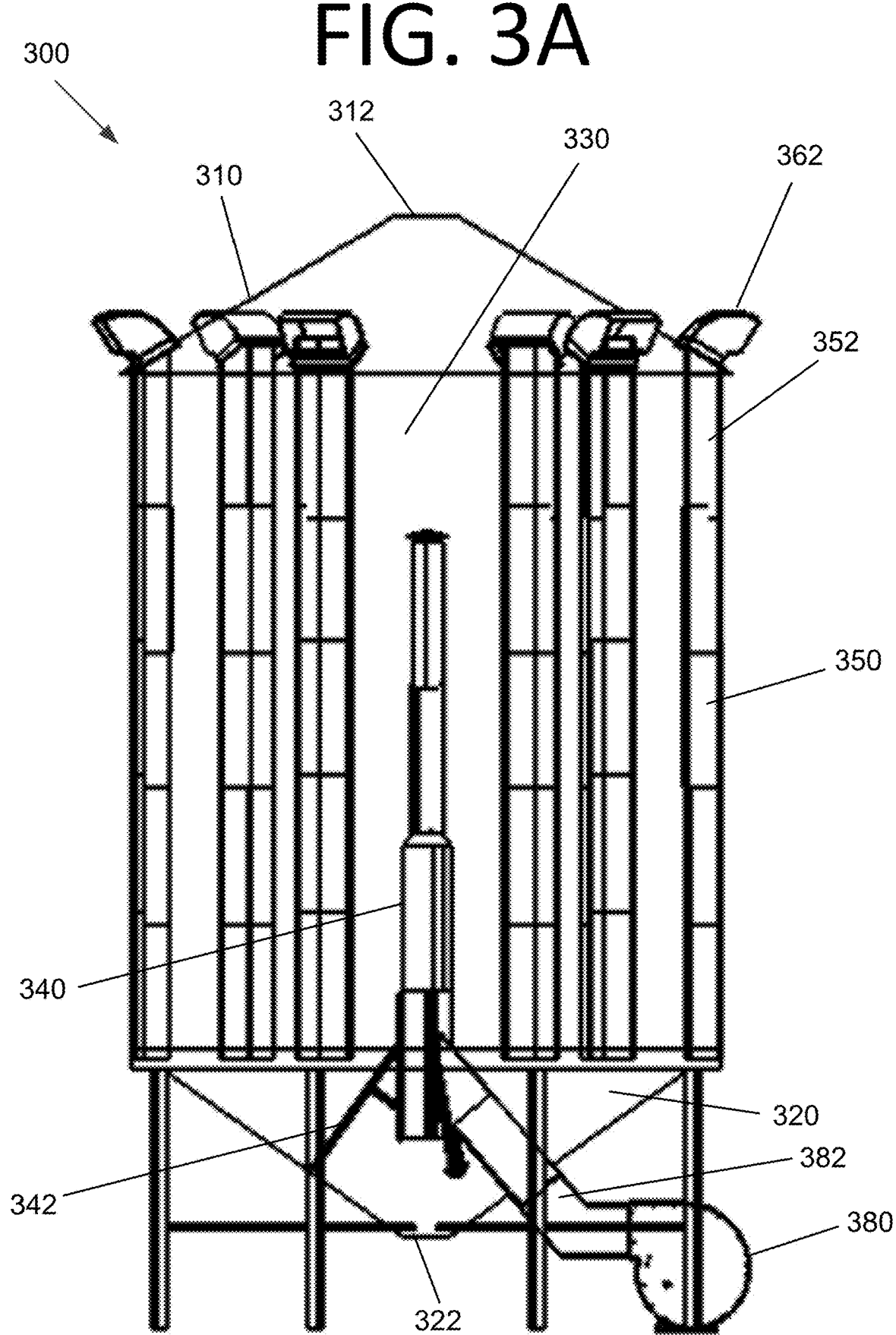
FIG. 3A is a side view illustrating a grain bin, according to an embodiment of the present invention.

FIG. 3A is a cutaway perspective view illustrating a grain bin 300, according to an embodiment of the present invention. Grain bin 300 includes a roof 310 with a coverable hole 312 at the top for filling the grain bin. Grain bin 300 also includes a hopper bottom 320 with a coverable opening 322. Grain bin 300 further includes a wall 330 that is constructed from sections of sheet metal in this embodiment. A central air distribution tube 340 is located at the center of grain bin 300 and is supported on hopper bottom 320 by legs 342. Air is provided to central air distribution tube 340 by a fan 380, which is connected to central air distribution tube 340 via a fan duct 382.

Figure 3B:
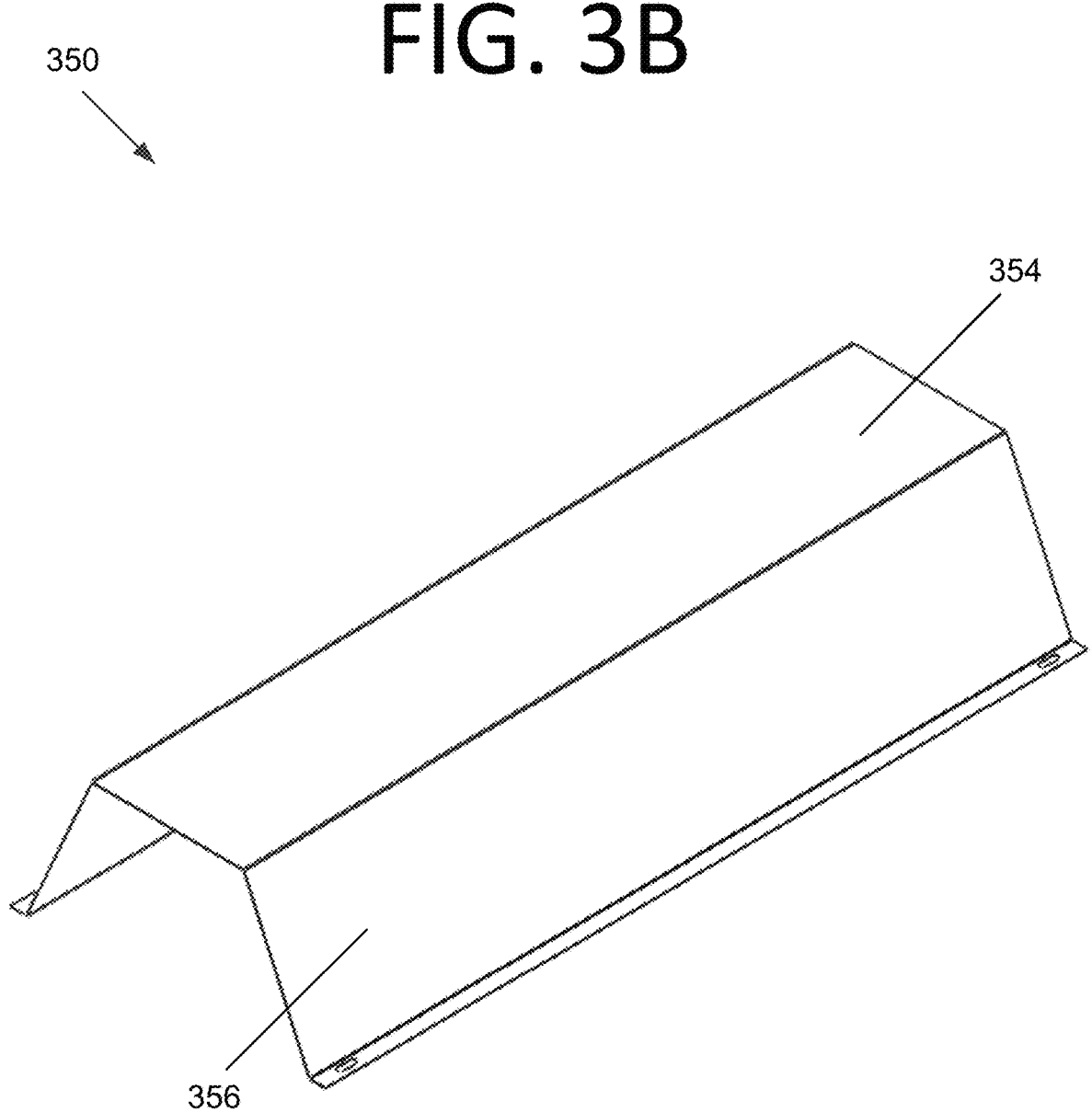
FIG. 3B is a perspective view illustrating a channel, according to an embodiment of the present invention.
Figure 3C:
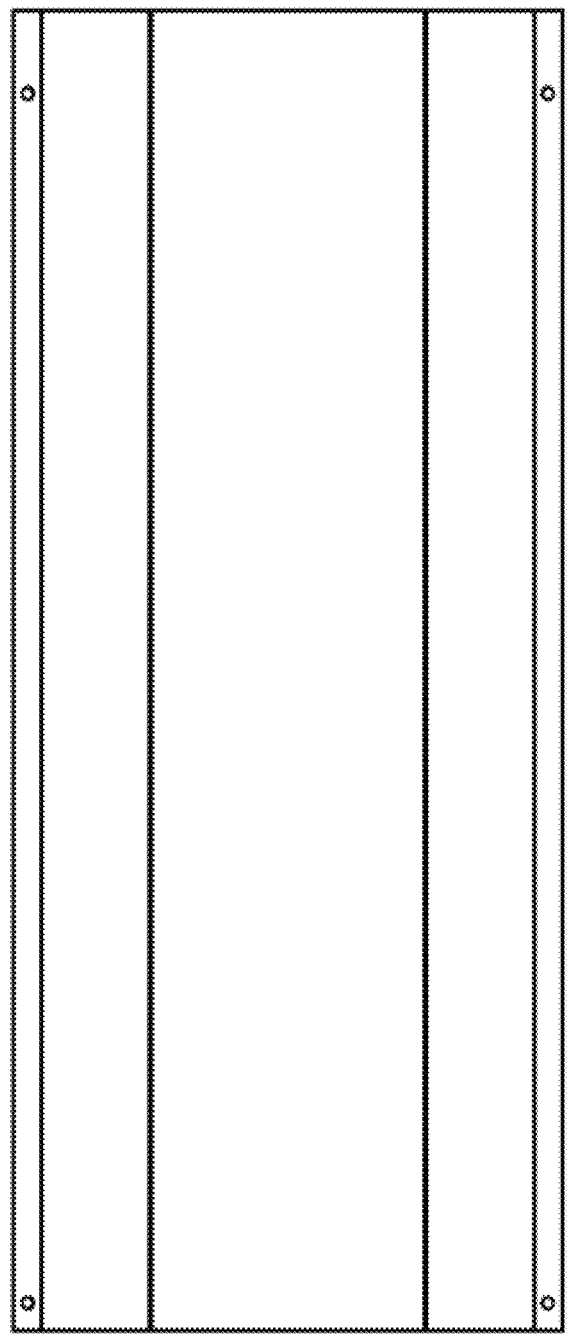
FIG. 3C is a front view illustrating the channel, according to an embodiment of the present invention.
Figure 3E:
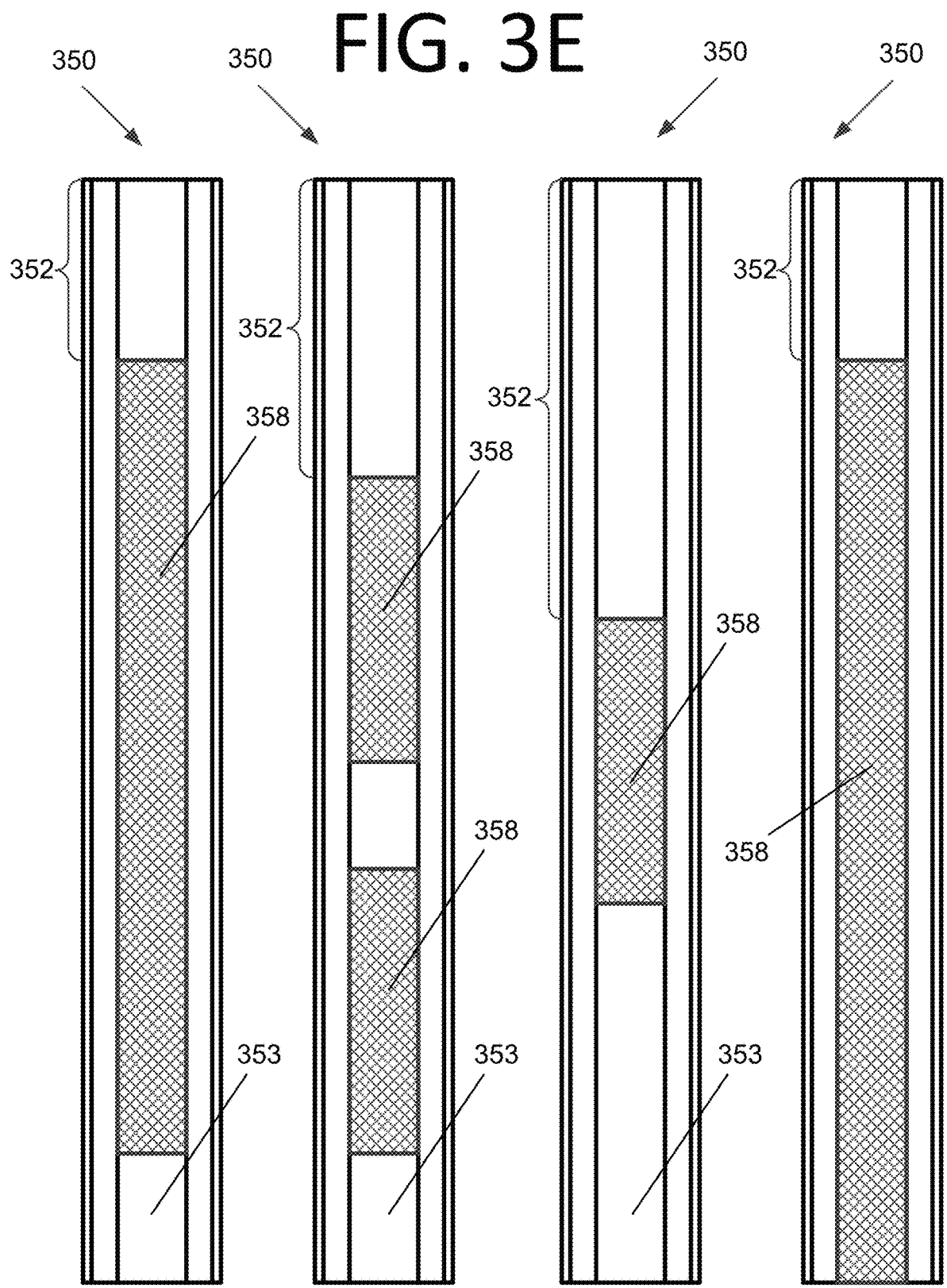
FIG. 3E is a front view illustrating some example channel perforation configurations, according to an embodiment of the present invention.
Figure 3F:
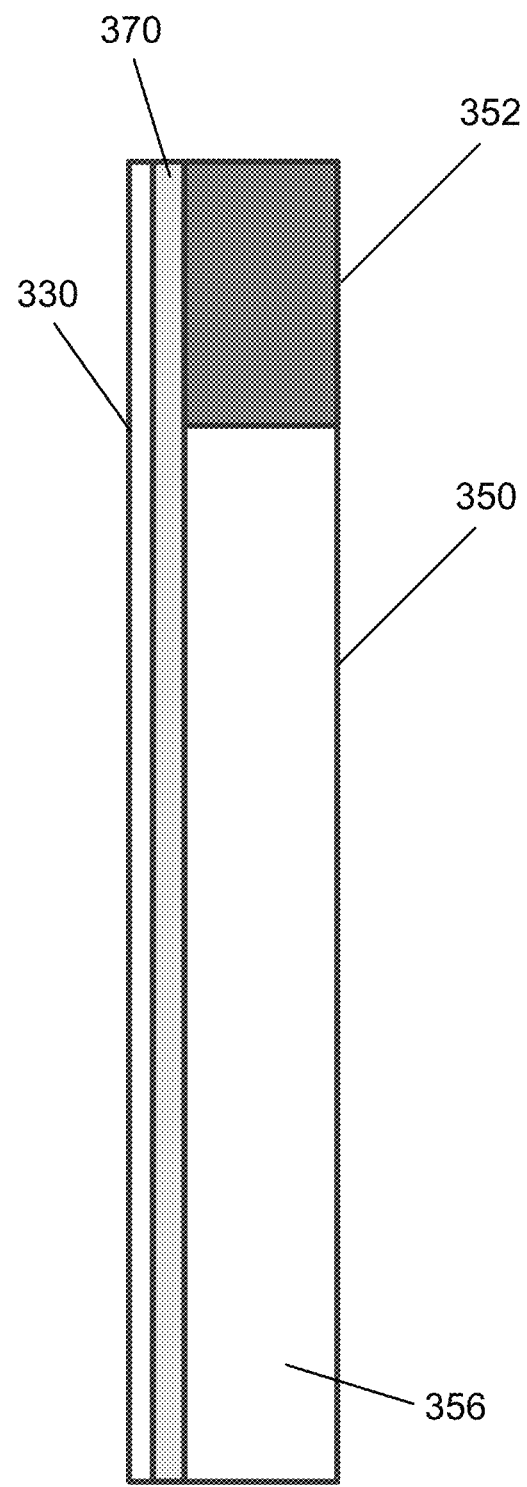
FIG. 3F is a side view illustrating a portion of a channel with insulation between the channel and the grain bin wall, according to an embodiment of the present invention.

Air from fan 380 flows outward from central air distribution tube 340 towards channels 350. In this embodiment, channels 350 are attached to wall 330, with insulation potentially sandwiched in between channels 350 (including top portions 352 of channels 350 in some embodiments) and wall 330 (see FIG. 3F, for example). Insulation may be a solid piece, sprayed, assembled from multiple pieces, etc. without deviating from the scope of the invention. Top portions 352 of channels 350 are not perforated and are covered where exposed above roof 310 where they extend through channel air vents 360 by channel air vent covers 362. See FIGS. 3G-I. Channel air vent covers 362 are partially curved in this embodiment to help keep rain and snow from entering channels 350.

Figure 3G:
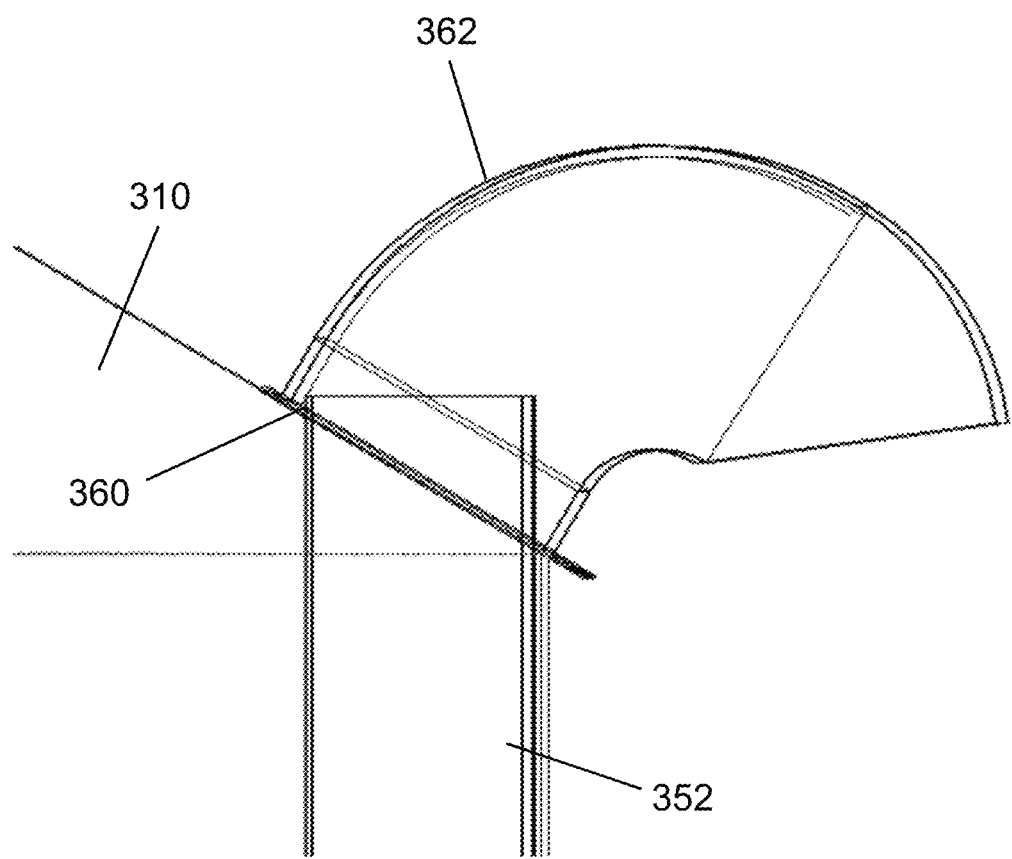
FIG. 3G is a side perspective view illustrating a top portion of a channel covered by a channel air vent cover, according to an embodiment of the present invention.
Figure 3H:
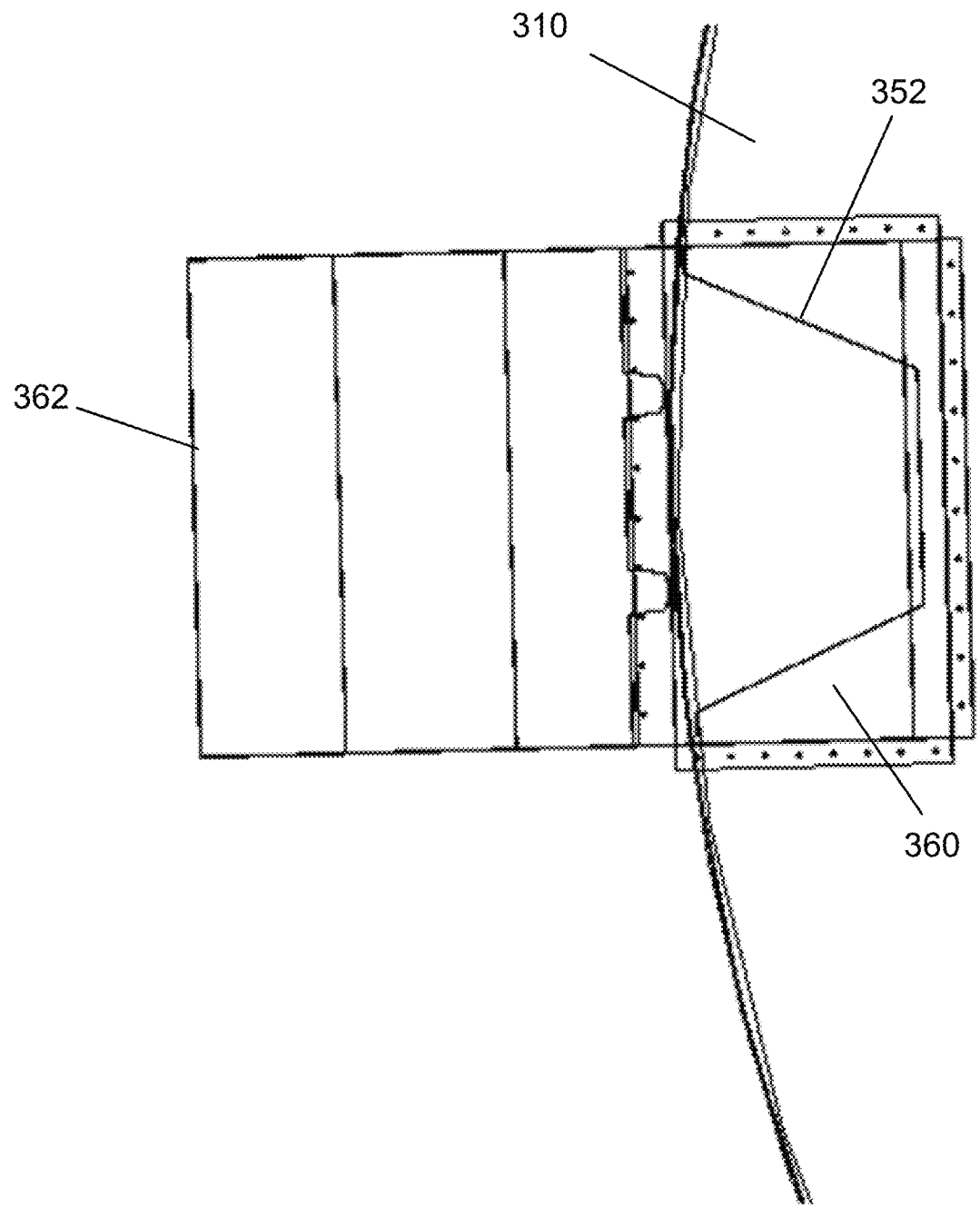
FIG. 3H is a top view illustrating the top portion of the channel covered by a channel air vent cover, according to an embodiment of the present invention.
Figure 31:
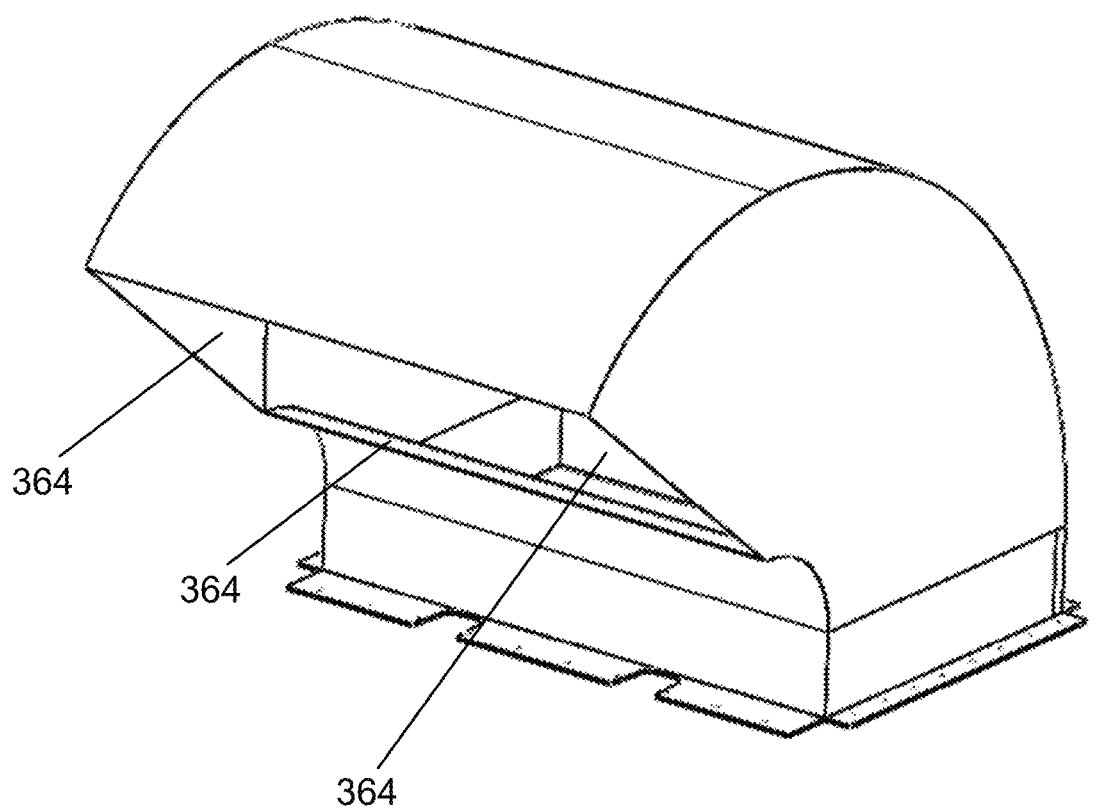

As can be seen in FIGS. 3A and 3G, for example, part of top portion 352 extends through roof 310 and into channel air vent 360. See FIGS. 3G and 3H, for example. Channel air vents 360 are larger than the area of top portions 352 of channels 350 in this embodiment to allow air between roof 310 and the grain pile to vent through channel air vents 360 as well.

The interiors of channel air vent covers 362 may be insulated. See FIG. 3I, for example. This is because channel air vent covers 362 may experience the same condensation problem as grain bin wall 330 and roof 310 in that warm damp air that comes into contact with channel air vent covers 362 will cause condensation to form thereon. Channel air vent covers 362 are curved and installed so they are at a somewhat downward angle due to the slope of roof 310 so that some of the condensation will run out of channel air vent covers 362 and drip onto the ground below. However, much of the condensation would drip back into the grain bin, which would cause the same problem as moisture condensing on the bin walls.

As shown in FIG. 3I, insulated interior walls 364 of channel air vent covers 362 prevent bare metal or other non-insulated material from being exposed. Interior walls 364 may be insulated using spray foam, for example. However, any suitable insulation, such as custom shaped insulation that conforms to the inside of channel air vent covers 362, may be used without deviating from the scope of the invention.

In the unusual situation where some grain gets into channels 350, the bottoms of channels 350 may have an opening that allows the grain to exit out the bottom of channels 350, and then out of hopper bottom 320, when grain bin 300 is emptied. Grain piles against the bottom of channels 350 when grain bin 300 is filled. This essentially closes the bottom of channels 350 off. Air will not flow out the bottom of channels 350 in a meaningful amount because due to this blocking grain, which has a high resistance to airflow. Instead, the air will take the path of least resistance, which is upwards within channels 350.

In some embodiments, channels 350 are designed to bolt onto wall 330 using existing bolts that are required to hold the panels of wall 330 together. If for some reason the existing bolts cannot be utilized, channels 350 could be attached to walls 330 using machine screws, for example. By utilizing the existing bolt holes, however, the addition of channels 350 does not weaken the structure of wall 330 or introduce new holes that could cause moisture leakage into grain bin 300. Also, by using the existing bolt holes, channels 350 should be able to be retrofitted to new and existing grain bins. The ideal time to install channels 350 would be when grain bin 300 is constructed, but installation can also be performed later (e.g., when grain bin 300 is not being used).

At least portions of surface(s) of channels 350 facing towards central air distribution tube 340 are perforated so air flowing from central air distribution tube 340 through the grain can enter channels 350. FIGS. 3B-D show perspective, front, and top/bottom views of a portion of channel 350 without perforations being visible, according to an embodiment of the present invention. In this embodiment, channel 350 has a trapezoidal shape. However, any other suitable shape may be used without deviating from the scope of the invention, such as "V" shape 350A and rounded shape 350B shown in FIG. 3D. Trapezoidal channel 350 has a front face 354 and side faces 356.

In this embodiment, there are six channels 350 inside grain bin 300. Channels 350 are sized to allow the desired airflow in some embodiments (e.g., more than 5000 cfm of airflow when used in a 5,000 bushel grain bin). For instance, in some embodiments, front face 354 is approximately 10" wide, side faces 356 are approximately 10" wide, the "bottom" of the trapezoid between the ends of side faces 356 opposite front face 354 is approximately 18", and the perpendicular width between front face 354 and the wall "side" of the trapezoid is approximately 9". However, any suitable dimensions may be used for channels 350 without deviating from the scope of the invention. Generally speaking, the more airflow that is desired, the larger the channels should be. A common rule of thumb used in NAD is to provide a minimum of one square foot of roof vent area for every thousand cfm of airflow. For this reason, in some embodiments, the channel walls are sized to provide a minimum of one square foot of area for every thousand cfm of airflow. It should also be noted that in certain embodiments, grain bin 300 may include one or more channels that are located inward from wall 330. See FIG. 4, for example.

FIG. 3E shows some example channel perforation configurations. In this embodiment, only front face 354 of channel 350 has perforations. However, in certain embodiments, portions of side faces 356 may have perforations as well.

Perforations are included in perforated sections 358 and may be of the types shown in FIG. 2, for example, or any other suitable perforation type without deviating from the scope of the invention. For instance, front face 354 may include perforations along the entire face except for solid top portion 352 (far right), front face 354 may include perforations along the entire face except for solid top portion 352 and a bottom portion 353 closest to hopper bottom 320 (far left and center right), multiple perforated portions 358 may be included on a single channel 350, etc. In some embodiments, perforated portions of channels 350 may be provided and aligned with sections of central air distribution tube 340 that are providing air to a respective channel 350. It should be readily apparent that solid top portion 352 is not a solid piece of metal. Rather, describing this component as "solid" herein means that while solid top portion 352 is hollow, the outside of solid top portion 352 is made of a solid piece of metal, plastic, ceramics, etc.

In some embodiments, insulation is provided in grain bin 300 between channels 350 and wall 330, along portions of wall 330 not covered by channels 350, or both. FIG. 3F is a side view illustrating insulation 370 sandwiched between wall 330 and channel 350 (including top portion 352). Without insulation, the warm, relatively damp air would enter the air space in channel 350 after flowing through the grain and contact wall 330. Wall 330 is typically cooler than the air, which would cause moisture to condense on wall 330 and then run down wall 330 or freeze on wall 330 if the temperature is below freezing. Providing insulation 370 between wall 330 and channel 350 keeps the air from contacting wall 330. This way, the warm moist air travels up channel 350 and out of grain bin 300 via channel air vent 360.

In some embodiments, channels are installed inward from the wall of the grain bin. FIG. 4 is a side view illustrating an embodiment of such a grain bin 400. Like grain bin 300 of FIGS. 3A-I, grain bin 400 includes a roof 410, a hopper bottom 420, and a wall 430. Other components not shown in FIG. 4, such as a central air distribution tube and channel air vents, may also be included. However, in this embodiment, channels 440 are installed inward from wall 430, affixed to and hanging from roof 410. However, in some embodiments, channels 440 may be affixed to hopper bottom 420 in addition to or in lieu of roof 410. Top portions 442 of channels 440 extend through channel openings 450 in roof 410, and may be covered by channel air vent covers (not shown).

Channels 440 may be cylindrical, for example, and perforated portions 444 face towards the central air distribution tube. Other portions may be solid. An advantage of this architecture is that the grain between channel 440 and wall 430 would act as insulation, preventing condensation on wall 430. However, a downside is that the grain located between channel 440 and wall 430 would not receive airflow, and therefore, would not dry. Channels 440 would also add extra weight to roof 410, which may need to be reinforced to handle this weight in some embodiments.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A grain bin, comprising:
a central air distribution tube configured to disperse air outward from a center of the grain bin;
a wall;
one or more insulated channels located within the wall of the grain bin, the one or more insulated channels configured to function as air ducts such that, in operation, at least some of the dispersed air from the central air distribution tube flows through grain in the grain bin towards the one or more insulated channels and out of the grain bin via the one or more insulated channels;
a plurality of channel air vents for each of the one or more insulated channels, wherein top portions of the one or more insulated channels extend partially outward through a roof of the grain bin via respective channel air vents; and
channel air vent covers covering top portions of the one or more insulated channels and the channel air vents, the channel air vent covers configured to allow the dispersed air exiting upwards through the one or more insulated channels to be exhausted outside the roof of the grain bin, wherein
at least part of portions of the one or more insulated channels facing towards the central air distribution tube are perforated, and
the channel air vent covers comprise insulation covering interior walls of the channel air vent covers, the top portions of the one or more insulated channels are solid, preventing the dispersed air from entering a space between grain stored in the grain bin and the roof of the grain bin, or both.

2. The grain bin of claim 1, further comprising:
insulation located between the wall and the one or more insulated channels.

3. The grain bin of claim 1, wherein
at least one of the one or more insulated channels is installed inward from the wall such that a space exists between the at least one of the one or more insulated channels and the wall, and
grain within the grain bin acts as insulation for the one or more insulated channels.

4. The grain bin of claim 3, wherein the one or more insulated channels are affixed to a roof of the grain bin, a bottom of the grain bin, or both.

5. The grain bin of claim 1, wherein the central air distribution tube is positioned vertically in a center of the grain bin and the dispersed air is dispersed horizontally outward from the central air distribution tube towards the one or more insulated channels.

6. The grain bin of claim 1, wherein a height of the central air distribution tube is shorter than an overall height of a center of the grain bin by an amount that is greater than a radius of the grain bin defined from a center of the grain bin to the wall of the grain bin.

7. The grain bin of claim 1, wherein each channel air vent has a larger cross-sectional area than an area of the top, open end portion of the respective insulated channel over which the respective channel air vent is located.

8. The grain bin of claim 1, wherein portions of the one or more insulated channels facing away from the central air distribution tube are covered with insulation.

9. A grain bin, comprising:
a central air distribution tube configured to disperse air outward from a center of the grain bin;
a wall;
one or more channels located within the wall of the grain bin, the one or more channels configured to function as air ducts such that, in operation, at least some of the dispersed air from the central air distribution tube flows through grain in the grain bin towards the one or more insulated channels and out of the grain bin via the one or more channels; and
insulation located between the one or more channels and the wall, wherein
at least part of portions of the one or more channels facing towards the central air distribution tube are perforated,
the central air distribution tube is positioned vertically in a center of the grain bin and the dispersed air is dispersed horizontally outward from the central air distribution tube towards the one or more channels, and
a height of the central air distribution tube is shorter than an overall height of a center of the grain bin by an amount that is greater than a radius of the grain bin defined from a center of the grain bin to the wall of the grain bin.

10. The grain bin of claim 9, wherein the insulation surrounds an interior of the wall.

11. The grain bin of claim 9, further comprising:
a plurality of channel air vents for each of the one or more channels,
wherein top portions of the one or more channels extend partially outward through a roof of the grain bin via respective channel air vents.

12. The grain bin of claim 11, further comprising:
channel air vent covers covering the top portions of the one or more channels and the channel air vents, the channel air vent covers configured to allow the dispersed air to exiting upwards through the one or more channels to be exhausted outside the roof of the grain bin.

13. The grain bin of claim 12, wherein the channel air vent covers comprise insulation covering interior walls of the channel air vent covers.

14. The grain bin of claim 11, wherein each channel air vent has a larger cross-sectional area than an area of the top, open end portion of the respective channel over which the respective channel air vent is located.

15. The grain bin of claim 11, wherein the top portions of the one or more channels are solid, preventing the dispersed air from entering a space between grain stored in the grain bin and the roof of the grain bin.

16. An apparatus, comprising:
a central air distribution tube configured to disperse air outward from a center of the apparatus;
a wall;
a plurality of insulated channels located within the wall comprising respective top portions that extend outward through a roof of the apparatus, the plurality of insulated channels configured to function as air ducts such that, in operation, at least some of the dispersed air from the central air distribution tube flows through grain in the grain bin towards the plurality of insulated channels and out of the apparatus via the plurality of insulated channels;
channel air vents for each of the plurality of insulated channels, the channel air vents covering the top portion of the respective channel that extends out from the roof of the apparatus; and
channel air vent covers covering the top portions of the plurality of insulated channels and the channel air vents, the channel air vent covers configured to allow the dispersed air exiting upwards through the plurality of insulated channels to be exhausted outside the roof of the apparatus.

17. The grain bin of claim 16, wherein the channel air vent covers comprise insulation covering interior walls of the channel air vent covers.

18. The apparatus of claim 16, wherein each channel air vent has a larger cross-sectional area than an area of the top, open end portion of the respective channel over which the respective channel air vent is located.

* * * * *